United States Patent [19]

Hollis et al.

[11] Patent Number: 4,842,735

[45] Date of Patent: Jun. 27, 1989

[54] OIL SKIMMING APPARATUS

[76] Inventors: Calvin L. Hollis, Rt. 1, Box 12; James L. Taylor, Rt. 2, Box 284, both of, Spearsville, La. 71277

[21] Appl. No.: 171,277

[22] Filed: Mar. 21, 1988

[51] Int. Cl.⁴ .......................................... F02B 15/04
[52] U.S. Cl. .................................. 210/242.3; 210/923
[58] Field of Search ............................. 210/242.3, 923

[56] References Cited

U.S. PATENT DOCUMENTS

| | | | |
|---|---|---|---|
| 3,613,891 | 10/1977 | Cloutier | 210/242.3 |
| 3,700,108 | 10/1972 | Richards | 210/242.3 |
| 3,762,558 | 10/1973 | Anderson | 210/242.3 |
| 4,261,827 | 4/1981 | Bronnec | 210/242.3 |
| 4,264,444 | 4/1981 | Bronnec | 210/242.3 |
| 4,322,294 | 3/1982 | Price | 210/242.3 |

Primary Examiner—Charles Hart
Attorney, Agent, or Firm—John M. Harrison

[57] ABSTRACT

An oil skimming apparatus for removing a film of oil from the surface of a water body, which apparatus includes a watercraft such as a barge, provided with an oil collection tank and a skimming boom slidably mounted in angular relationship on one end of the barge. A conveyor is provided in the skimming boom, in order to convey the skimmed oil to elevated oil drain chutes located on the rear end of the skimming boom, where the oil drains into the oil collection tank. In a preferred embodiment, a skimming plate is provided in the skimming boom for location at the oil-water interface on the surface of the water body and skimming the oil responsive to adjustment of the skimming boom upwardly or downwardly, using a winch.

11 Claims, 2 Drawing Sheets

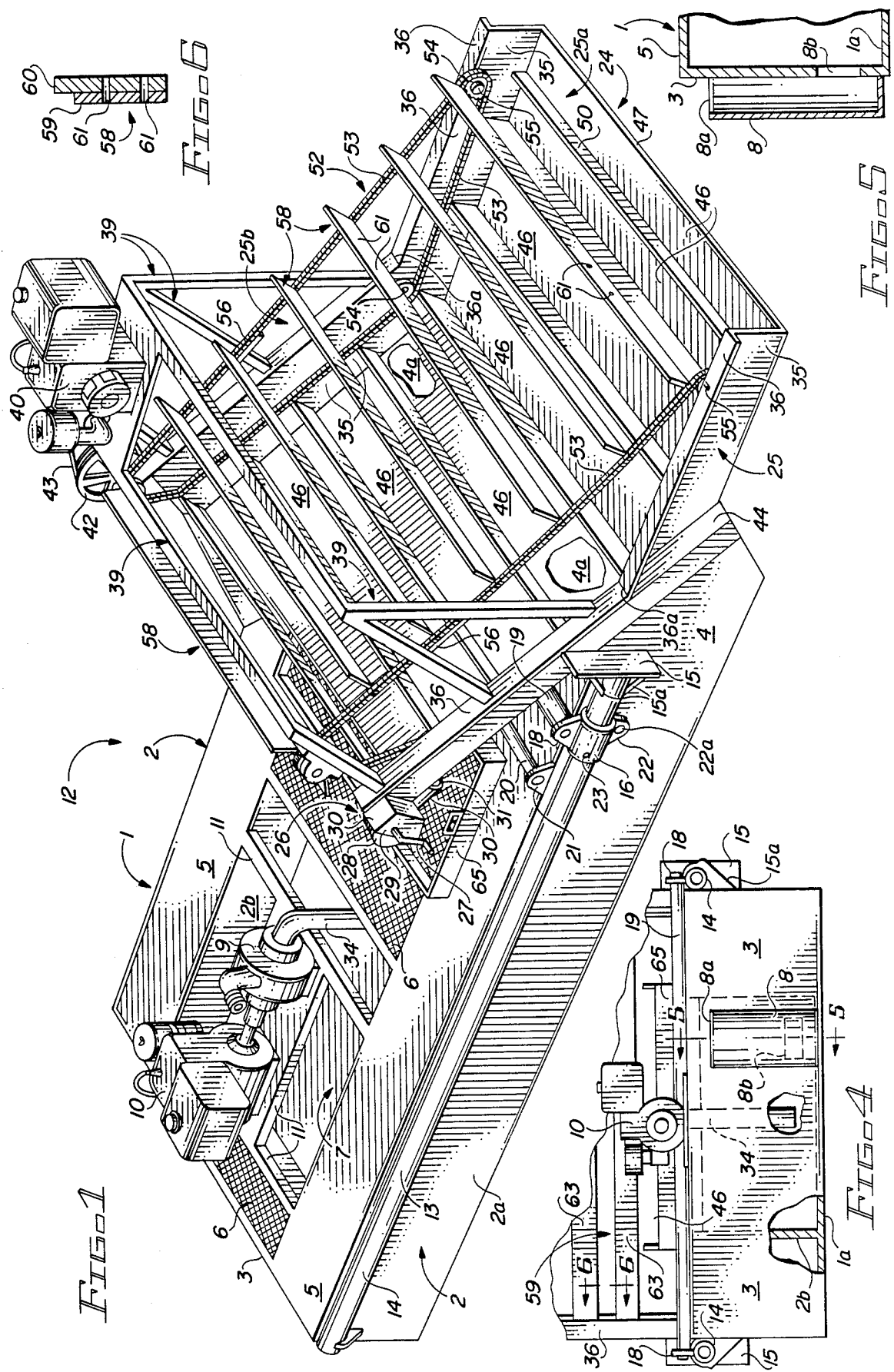

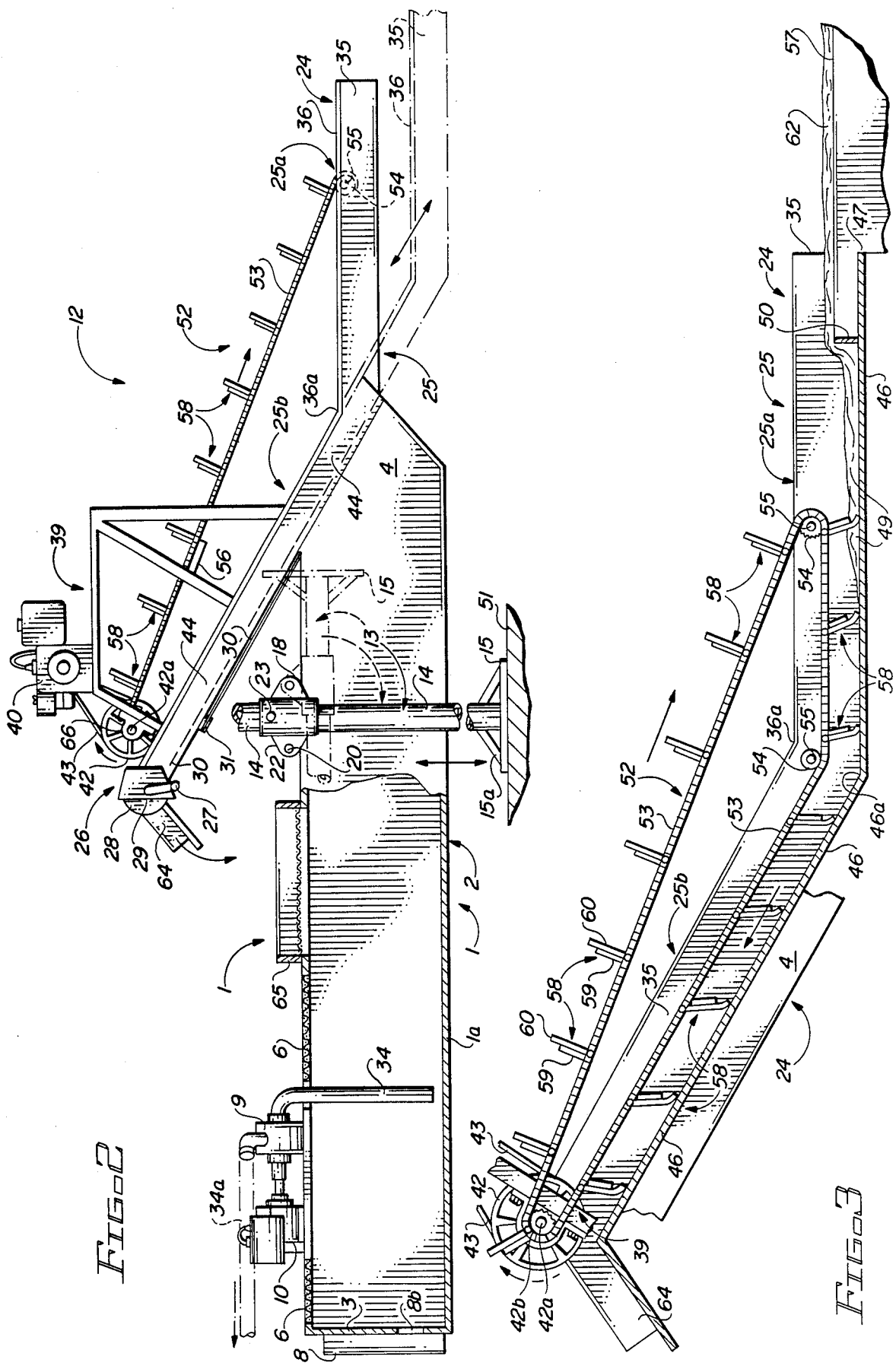

OIL SKIMMING APPARATUS

BACKGROUND OF THE INVENTION

1. Field of the Invention

This invention relates to apparatus for separating oil from water and more particularly, to a floating oil skimming watercraft which is designed to remove a film of oil of various thickness from a water body by skimming the oil from the surface of the water body using a collection boom and a conveyor system and storing the oil in a self-contained holding tank. In a preferred embodiment of the invention, the oil skimming apparatus is characterized by a barge capable of being transported by a trailer and equipped with a pair of spaced pontoons spanning a holding tank for accumulating the oil skimmed from the surface of a water body, an adjustable boom slidably mounted in angular relationship on the front of the pontoons and a conveyor system mounted on the boom for conveying oil skimmed by the boom upwardly to a pair of drain chutes, where the oil drains by gravity into the holding tank. The boom is slidably adjustable on the pontoons of the barge, in order to facilitate location of a skimming plate at the oil-water interface and cause the flow of oil over the skimming plate and into the boom apparatus for sequential contact by a series of paddles mounted in the conveyor.

One of the problems regarding pollution of waterways in the United States and other countries of the world is that of oil leaks. These leaks occur from improperly installed or poorly maintained oil collection tanks, oil spills from damaged tankers in the Gulf of Mexico and other water bodies of the world and from various other sources. The problem of oil spills in the Gulf of Mexico has been widely publicized, as the oil not only pollutes the water itself, but also deposits on the beach areas of the coast, thus necessitating massive clean-up operations. When deposited in coastal waters and on coastal beaches, the oil constitutes a threat to wildlife and greatly reduces tourism in the area. For example, birds such as seagulls and the like, are unable to fly when the oil coats their wings and feathers. Such oil deposits further hamper or render fishing operations impossible and when the oil washes onto a beach, it must be removed by hand, using straw, hay and other absorbent materials. Such clean-up operations are extremely expensive and are never totally effective to remove the oil. Furthermore, oil spills in rivers and waterways which serve as water supplies for various cities and towns threaten these water supplies and may extend for many miles down the river or waterway as the oil slick moves with the current.

2. Description of the Prior Art

Various clean-up techniques are well known to those skilled in the art for removing or "skimming" oil films from water. Such clean-up operations often include the use of floating oil-containing booms which are deployed to contain oil slicks in the area of an oil leak or spill until the oil can be removed by mechanical means. Conventional mechanical oil-removing devices are frequently hampered by wind, wave and tidal action, as well as current, under circumstances where a river or flowing body of water is involved and various types of these mechanical apparatus for effecting the skimming of oil from water are well known to those skilled in the art.

It is an object of this invention to provide a new and improved oil skimming apparatus which is characterized by a floating watercraft fitted with a slidably-mounted skimming boom, the rear portion, or oil-dispensing end of which boom is secured in angular relationship on the front of the watercraft and the front segment, or oil-collecting end, being horizontally oriented, which boom is further provided with a conveyor system for conveying oil which has been skimmed from a water body by the boom along the boom for depositing into a holding tank located in the watercraft.

Another object of the invention is to provide a new and improved oil skimming apparatus which is characterized by a watercraft or barge provided with an oil collection tank, a slidably-mounted boom oriented in angular relationship on the front of the barge for adjustment of a horizontally-disposed oil-collecting end of the boom at a selected depth in the water body and a conveyor system mounted on the boom for receiving oil skimmed from the surface of the water body and conveying the oil upwardly along the boom to a pair of collecting chutes, where the oil drains into the oil collection tank.

Still another object of the invention is to provide an oil skimming apparatus which includes a small, maneuverable and easily transported watercraft that is flotable on substantially any water body and in a preferred embodiment, is characterized by a pontoon barge fitted with a holding tank having an angularly and slidably-mounted boom on the front thereof, with a vertically-oriented skimming plate provided in the oil-collecting end of the boom for skimming the oil from the surface of the water body, and further including a conveyor system mounted on the boom for contacting the oil flowing over the skimming plate and delivering the oil to the opposite end of the boom, where it drains into the holding tank.

A still further object of this invention is to provide an oil skimming apparatus for skimming an oil film from the surface of a water body, which apparatus includes a watercraft such as a barge that is capable of being stabilized by a pair of stabilizing legs in a selected location on the water body and is fitted with a slidably-mounted skimming boom having an oil-dispensing end that is angled downwardly with respect to the horizontal and a horizontally-oriented oil-collecting end provided with a skimming plate, which skimming plate can be adjustably located at the approximate interface between the oil and water to skim the oil from the surface of the water and further including a conveyor system provided on the skimming boom for continuously wiping oil which flows over the skimming plate, to the oil-dispensing end of the boom, where the oil flows by gravity into a holding tank provided in the watercraft.

SUMMARY OF THE INVENTION

These and other objects of the invention are provided in a portable oil skimming apparatus for skimming a film of oil from a water body, which apparatus is characterized by a barge fitted with a pair of spaced pontoons and a holding tank, a skimming boom slidably mounted on the front of the barge in angular relationship and featuring a horizontally-oriented oil-collecting end for adjustably positioning a skimming plate mounted in the oil-collecting end at the approximate oil-water interface near the water body surface and further including a conveyor system located in the skimming boom for transferring oil which flows over the skimming plate upwardly along the skimming boom to a pair of collecting chutes, which deliver the oil by gravity flow to the holding tank. In a preferred embodiment of the invention, a weir is provided on the stern of the barge for draining water from the holding tank to the water body and a winch is mounted on the skimming boom for ajusting the oil-collecting end of the skimming boom to a selected depth in the water body.

BRIEF DESCRIPTION OF THE DRAWING

The invention will be better understood by reference to the following drawing, wherein:

FIG. 1 is a perspective view of a preferred embodiment of the oil skimming apparatus of this invention;

FIG. 2 is a side view, partially in section, of the oil skimming apparatus illustrated in FIG. 1;

FIG. 3 is a side sectional view of the skimming boom of the oil skimming apparatus illustrated in FIGS. 1 and 2;

FIG. 4 is a rear view, partially in section, of the stern portion of the oil skimming apparatus illustrated in FIG. 1;

FIG. 5 is a sectional view taken along line 5—5 of a weir mounted in the stern portion of the oil skimming apparatus illustrated in FIG. 4; and FIG. 6 is a sectional view taken along line 6—6 of a conveyor paddle element illustrated in FIG. 4.

DESCRIPTION OF THE PREFERRED EMBODIMENTS

Referring initially to FIG. 1 of the drawings the oil skimming apparatus of this invention is generally illustrated by reference numeral 12. The oil skimming apparatus 12 includes a barge 1 provided with a pair of spaced, parallel pontoons 2, which are defined by parallel exterior pontoon plates 2a and interior pontoon plates 2b. The pontoons 2 extend from a front end 4, respectively, to a common transom 3 and each of the pontoons 2 further include an angled front end plate 4a. Deck plates 5 close the tops of the pontoons 2 and deck grids 6 span the pontoons 2, in order to facilitate walking on the barge 1 and a bottom plate 1a spans the entire bottom of the barge 1 and closes both of the pontoons 2. An oil collection tank 7 is located between the pontoons 2 and is defined by the pontoons 2, the barge bottom 1a and the transom 3, and a collection tank pump 9, along with a collection tank pump engine 10, is supported by a pump support frame 11 over the oil collection tank 7. As illustrated in FIGS. 4 and 5, a weir 8, provided with a weir overflow 8aa, is provided on the transom 3 of the barge 1, in order to facilitate a flow of residual water which is collected with the oil in the oil collection tank 7, through the weir opening 8b, in order to separate the water from the oil contained in the oil collection tank 7, as hereinafter further described. A separate stabilizing leg 13 is rotatably mounted on each of the pontoons 2, respectively, and is further characterized by an elongated support pipe 14, having a foot 15 welded or otherwise provided on one end thereof and stabilized in position by means of foot braces 15a. A separate pipe sleeve 16 fits in concentric relationship over a portion of each support pipe 14 and each pipe sleeve 16 includes a sleeve pivot bracket 18, as further illustrated in FIG. 1. An adjusting bolt 23 is threaded into each of the pipe sleeves 16, for engaging the underlying companion stabilizing leg 13 and preventing movement of each respective stabilizing leg 13 with respect to the corresponding pipe sleeve 16. A sleeve pivot pipe 19 is also welded or otherwise secured to the pontoons 2 of the barge 1 and extends in pivotal relationship through the sleeve pivot bracket 18, in order to facilitate pivoting of each pipe sleeve 16 and the companion stabilizing leg 13 from a horizontal, stored configuration as illustrated in FIG. 1, to an upright, supporting configuration. This vertical orientation of the stabilizing legs 13 is designed to stabilize the barge 1 in a desired location on a water body and to help effectuate the oil skimming operation. A leg stay 20 is slidably mounted on each of the pontoons 2 by means of a leg stay flange 21, respectively, and each leg stay 20 is designed to engage a companion leg flange opening 22a, provided in the companion leg flange 22, which is welded to each of the stabilizing legs 13, in order to secure both stabilizing legs 13 in vertical orientation with respect to the pontoons 2.

Referring now to FIGS. 1-3 of the drawings, a skimming boom is generally illustrated by reference numeral 24 and is characterized by a boom frame 25, having an angled segment 25b, which is slidably mounted in angular relationship to the angled front end plates 4a of the pontoons 2. The boom frame 25 further includes a winch 26, mounted on the angled segment 25b and having a winch crank 27 attached to a winch drum 28, which winch drum 28 is further rotatably mounted in a winch frame 29 in conventional fashion and carries a winch cable 30. The winch cable 30 extends through a boom frame pulley 31, which is secured to one of the side frame members 35 of the boom frame 25. The winch cable 30 further extends through the boom frame pulley 31 to the barge 1, such that rotation of the winch crank 27 in the clockwise direction as viewed in FIG. 1 causes the boom frame 25 to elevate in slidable relationship with respect to the pontoons 2. Release of the boom frame 25 for descent with respect to the pontoons 2 is effected by initially releasing tension on the winch cable 30, removing a conventional pawl (not illustrated) from engagement with the winch drum 28 and allowing the winch crank 27 to rotate in a counterclockwise direction as the boom frame 25 descends.

In a most preferred embodiment of the invention, and referring again to FIGS. 1-3, the boom frame 25 is further characterized by side frame flanges 36, which extend outwardly in a common plane from each of the parallel side frame members 35. The side frame members 35 and side frame flanges 36 are angled at a side frame flange crease 36a, as illustrated in FIGS. 2 and 3, in order to define a horizontal segment 25a extending from the angled segment 25b of the boom frame 25. A conveyor engine support frame 39 is welded to the side frame flanges 36 of the side frame members 35, respectively, and supports a conveyor engine 40, which is bolted or otherwise securely mounted to the conveyor engine support frame 39, as illustrated in FIGS. 1 and 2. A conveyor engine drive pulley (not illustrated) is fitted to the drive shaft of the conveyor engine 40 and a pair of parallel tracks 44 are welded to the downwardly-depending front end plates 4a of the pontoons 2, as illustrated in FIG. 1. The upper portions of the side frame members 35 which define the angled segment 25b of the boom frame 25 slidably engage the tracks 44, respectively, in order to facilitate movement of the boom frame 25 upwardly and downwardly responsive to operation of the winch 26, as heretofore described. A boom bottom panel 46 spans the distance between, and is welded to, the respective side frame members 35 and the boom bottom panel 46 is upward-turned at a boom bottom panel crease 46a, which corresponds to the side frame flange creases 36a, respectively, in the side frame flanges 36, in order to follow the contour of the horizontal segment 25a and angled segment 25b of the boom frame 25. The boom bottom panel 46 terminates at the bottom end of the horizontal segment 25a in a boom bottom panel edge 47, to define the extending end of the horizontal segment 25a of the boom frame 25. A skimming plate 50 projects upwardly in substantially vertical relationship from the boom bottom panel 46 between the side frame members 35, in order to skim a film of oil from a water body and collect the oil on the boom bottom panel 46 behind the skimming plate 50, as hereinafter further described.

Referring again to FIGS. 1–3 and 6 of the drawings, a conveyor 52 is mounted in the boom frame 25 above the boom bottom panel 46 and is fitted with a pair of conveyor chains 53, disposed in substantially parallel relationship, which conveyor chains 53 are rotatably mounted to the side frame flanges 36 of the side frame members 35 by two sets of spaced, aligned chain sprockets 54, respectively, which are mounted on companion sprocket axles 55, that are welded to the side frame flanges 36, respectively. The oil-discharge ends of the conveyor chains 53 are secured to spaced pulley shaft sprockets 42b, respectively, which are secured to each end of a rotatable conveyor pulley shaft 42a that is journalled for rotation in the conveyor engine support frame 39 by means of bearings 66. A pair of chain guides 56 are located approximately halfway between the top segment of the conveyor 52 and the bottom segment thereof and are welded to the conveyor engine support frame 39, to support the top segments of the conveyor chain 53, respectively, and prevent sagging. Multiple conveyor paddles 58 are attached to and extend between the conveyor chains 53 to transversely span the boom bottom panel 46 and serve to continuously sweep or wipe the oil collected behind the skimming plate 50 and on the boom bottom panel 46, upwardly along that portion of the boom bottom panel 46, rearwardly of the boom bottom panel crease 46a, which corresponds to the angled segment 25b of the boom frame 25. The conveyor paddles 58 are each further characterized in a preferred embodiment by a rectangular-shaped paddle plate 59, which is welded or otherwise secured to the conveyor chains 53 in substantially perpendicular relationship and a flexible paddle sweep 60, which is preferably constructed of a fabric material and is secured to the corresponding paddle plate 59 by means of spaced sweep mount rivets 61, as illustrated in FIGS. 1, 3 and 6. Each paddle sweep 60 projects downwardly from attachment to a companion paddle plate 59, and wipes the boom bottom panel 46 throughout the travel of each of the conveyor paddles 58, in order to continuously convey the collected oil from the horizontal segment 25a of the boom frame 25 upwardly along the angled segment 25b thereof and over the rear frame member 63 of the boom frame 25. In a most preferred embodiment of the invention, a pair of oil drain chutes 64 are welded or otherwise secured to each end of the rear frame member 63 in facing relationship, in order to channel oil flowing over the rear frame member 63 into a strainer 65, resting on the deck of the barge 1 and positioned above the oil collection tank 7. The collected oil flows over the rear frame member 63 and from the oil drain chutes 64, through the strainer 65 and by gravity flow, into the oil collection tank 7, as further illustrated in FIGS. 2 and 3.

Referring again to FIGS. 2 and 3, a conveyor pulley 42 is secured to one end of the conveyor pulley shaft 42a and is oriented in alignment with the conveyor engine drive pulley (not illustrated) such that a conveyor pulley belt 43 may be installed on the conveyor pulley 42 and the conveyor engine drive pulley to connect the conveyor engine drive pulley and the conveyor pulley 42. Accordingly, operation of the conveyor engine 40 causes the conveyor pulley 42 to rotate, thereby simultaneously rotating the conveyor chains 53 and the conveyor paddles 58.

In operation, and referring again to FIGS. 1–3 of the drawings, the oil skimming apparatus 12 of this invention is operated by initially floating the barge 1 in a water body having an oil film or slick thereon to be removed. The barge 1 is then in positioned in the desired location, whether facing the oncoming current in a river or stream or in a desired location adjacent the oil slick in a pit, pond, lake or ocean. The stabilizing legs 13 are then pivoted on the respective sleeve pivot pipes 19, along with the companion pipe sleeves 16 to the upright, vertical configuration and each leg stay 20 is inserted in the corresponding leg flange opening 22a of the leg flanges 22, which are welded to the support pipes 14, respectively, to stabilize the stabilizing legs 13 in this position. The two adjusting bolts 23 are then loosened to facilitate lowering the stabilizing legs 13 with respect to the pipe sleeves 16, respectively, in order to facilitate contact between the foot 15 on each of the stabilizing legs 13 and the water bottom 51, as illustrated in FIG. 2. The adjusting bolts 23 are then re-tightened to maintain the barge 1 in the desired position with respect to the oil film or slick. If the oil spill is in a large lake, the Gulf of Mexico or an ocean, the oil may be contained in a conventional floating oil-containing boom (not illustrated) which is oriented in a wide arc from both sides of the skimming boom 24 of the barge 1. The skimming boom 24 is then slidably manipulated in the parallel tracks 44 by operating the winch 26, to position the horizontal segment 25a of the boom frame 25 parallel to, and partially immersed in, the water body, with the top edge of the skimming plate 50 located below the oil film 62 at the approximate oil-water interface 57, as illustrated in FIG. 3. The conventional floating oil-containing boom is then manuevered to cause the oil layer to flow over the skimming plate 50 and collect on the boom bottom panel 46 in the space behind the skimming plate 50 between the side frame members 35, as further illustrated in FIG. 3. The conveyor engine 40 is then operated to cause the conveyor paddles 58 to rotate in a sweeping action to continuously sweep and wipe the skimmed and contained oil 49 upwardly along the horizontal and inclined areas of the boom bottom panel 46, over the rear frame member 63 and into the oil drain chutes 64 and finally through the strainer 65 and into the oil collection tank 7. As heretofore noted, the oil drain chutes 64, mounted on the opposite ends of the rear frame member 63, serve to channel the oil into the strainer 65. This procedure is continued until the oil is skimmed entirely from the surface of the water body.

Under circumstances where the oil skimming apparatus 12 is to be used in a river or stream where a current continuously moves the floating oil film or slick downstream, the barge 1 can be mounted in the current facing upstream, by deploying the stabilizing legs 13 in the manner described above. The skimming plate 50 is then adjusted to the approximate oil-water interface 57, by manipulating the boom frame 25 using the winch 26 as heretofore described and the oil film 62 is continually removed from the water as the current causes the oil to flow over the skimming plate 50 and collect on the boom bottom panel 46. As heretofore described, operation of the conveyor 52 causes the conveyor paddles 58 to continuously and sequentially wipe the boom bottom panel 46 and channel the contained oil 49 upwardly along the boom bottom panel 46 between the parallel side frame members 35, over the rear frame member 63 and into the oil drain chute 64, for collection in the oil collection tank 7.

Referring again to FIGS. 4 and 5 of the drawings, regardless of the care which is taken to position the skimming plate 50 precisely at the oil-water interface 57 between the oil film 62 and the surface of a water body containing an oil slick or film, a small quantity of water flows with the oil over the skimming plate 50 and collects in the oil collection tank 7. This oil-water mixture separates and stratifies in the oil collection tank 7, with the oil located on top of the water and the pressure of the oil causes the underlying water to flow by natural hydraulic action through the weir opening 8b in the weir 8, such that the water flows over the weir overflow 8a and exits the oil collection tank 7. This hydraulically-initiated water flow continues until the oil collection tank 7 contains very little water. When the oil collection tank 7 is substantially full, the collection tank pump engine 10 is operated and the companion collection pump 9 is used to pump oil from the oil collection tank 7 through the suction line 34 and the discharge line 34a, to a stand-by barge or vessel (not illustrated) or a collection tank or truck located on the shore, as desired. Alternatively, under circumstances where large quantities of oil are being separated from the water body by the oil skimming apparatus 12 on a continuous basis, conventional vacuum trucks can be used to pump the skimmed oil from the oil collection tank 7, in order to increase the efficiency of the oil skimming apparatus 12.

It has been found that the oil skimming apparatus of this invention is capable of removing up to 500 barrels of oil per hour from a water body under circumstances where vacuum trucks are available to remove the oil from the oil collection tank 7 as it is collected. In a most preferred embodiment of the invention, a skimmed oil level ranging from about 12 inches to about 16 inches is maintained in the oil collection tank 7 and when the oil is maintained at approximately this level, the underlying water is hydraulically removed through the weir 8 at an acceptable rate.

Since the thickness of the oil film or slick on a water body depends on such factors as the viscosity and temperature of the oil and the wind and current or tidal flow of the water body, multiple adjustments of the skimming boom 24 by operation of the winch 26 may be necessary, in order to maintain the top edge of the skimming plate 50 approximately at the oil-water interface 57. The frequency of manipulation of the skimming boom 24 in order to achieve this objective will depend upon the factors of temperature, wind, current and tidal conditions, as noted above.

It will be appreciated by those skilled in the art that the oil skimming apparatus of this invention is characterized by convenience and flexibility, in that the device is easily transported by trailer to a selected location where it can be launched and operated to efficiently remove and skim oil of substantially any viscosity from any water body, whether fresh or salt, and from pits, streams, gulf areas or oceans. Furthermore, the oil skimming apparatus can be constructed of substantially any size, depending upon the operation envisioned.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. An oil skimming apparatus for removing oil from the oil-covered surface of a water body, comprising:
    (a) a watercraft capable of mounting on a trailer for transportation and adapted for launching and floating on the water body;
    (b) a skimming boom slidably mounted on one end of said watercraft in angular relationship, said skimming boom having an oil-collecting end and an oil-dispensing end, whereby said oil-collecting end of said skimming boom is at least partially immersed in the oil-covered surface of the water body to a selected depth;
    (c) a skimming plate provided in upward-standing relationship on said oil-collecting end of said skimming boom for skimming the oil from the oil-covered surface of the water body; and
    (d) a pair of conveyor chains rotatably carried by said skimming boom in spaced, substantially parallel relationship, said conveyor chains oriented substantially parallel to the longitudinal axis of said watercraft; at least one paddle means carried by said conveyor chains and spanning said skimming boom in transverse relationship, said paddle means contacting said skimming boom in spaced relationship with respect to said skimming plate; and drive means carried by said skimming boom, said drive means connected in driving relationship to at least one of said conveyor chains for operating said conveyor chains and causing said paddle means to traverse said skimming boom and substantially wipe the oil from said skimming boom.

2. The oil skimming apparatus of claim 1 further comprising a conveyor pulley shaft rotatably carried by said oil-dispensing end of said skimming boom; a pair of pulley shaft sprockets carried by said conveyor pulley shaft; and a plurality of chain sprockets carried by said oil-collecting end and said oil-dispensing end of said skimming boom in spaced relationship and wherein said conveyor chains are rotatably mounted on said pulley shaft sprockets and said chain sprockets, respectively.

3. The oil skimming apparatus of claim 2 further comprising an oil collection tank provided in said watercraft and wherein the oil is transferred from said skimming boom by said conveyor means for deposit by operation of gravity into said oil collection tank.

4. The oil skimming apparatus of claim 3, further comprising winch means carried by said boom frame and a winch cable engaging said boom frame and said watercraft, for adjusting said boom frame with respect to said watercraft.

5. The oil skimming apparatus of claim 4 wherein said watercraft further comprises a pair of spaced pontoons and said oil collection tank is located between said pontoons.

6. The oil skimming apparatus of claim 5 further comprising:

(a) pump means mounted on said watercraft and provided in fluid-communication with said oil collection tank for pumping oil from said oil collection tank; and (b) weir means provided in said watercraft, said weir means communicating with said oil collection tank for substantially separating an oil-water mixture in said oil collection tank and wherein said drive means further comprises a gasoline engine and said at least one paddle means further comprises a plurality of paddles carried by said chains in spaced, substantially parallel relationship.

7. The oil skimming apparatus of claim 6 further comprising a pair of stabilizing legs rotatably and slidably carried by said pontoons, respectfully, whereby said stabilizing legs are selectivly rotatable from a first stored position substantially parallel to said pontoons to a second functional position substantially perpendicular to said pontoons and said stabilizing legs are slidably displaced in the water body with respect to said pontoons, for contacting the water bottom and stabilizing said watercraft in a selected position on the water body.

8. A portable floating oil skimming apparatus for removing a film of oil from the surface of a water body, comprising:

(a) a barge having a pair of spaced pontoons and an oil-collection tank provided between said pontoons;

(b) a skimming boom provided on one end of said barge, said skimming boom having a substantially horizontally-mounted oil-collecting end and an oil-dispensing end extending in angular relationship from said oil-collecting end, said oil-dispensing end slidably mounted in angular relationship on said one end of said barge and said oil-collecting end adapted for immersion in the surface of the water body;

(c) a skimming plate rigidly upward-standing from said oil-collecting end of said boom for immersion in the water body, with the top edge of said skimming plate provided substantially at the oil-water interface and skimming oil from the water body; and (d) a conveyor carried by said skimming boom, said conveyor characterized by a conveyor pulley shaft rotatably carried by said oil-dispensing end of said skimming boom; a pair of pulley shaft sprockets attached to said conveyor pulley shaft; a plurality of chain sprockets rotatably carried by said oil-dispensing end and said oil-collecting end of said skimming boom in spaced relationship; a pair of conveyor chains rotatably carried by said pulley shaft sprockets and said chain sprockets, respectively; a plurality of paddles spanning said skimming boom in substantially transverse relationship, said paddles attached to said conveyor chains in substantially parallel, spaced relationship; and adapted to sequentially engage said oil collecting end of said skimming boom and drive means carried by said skimming boom, said drive means connected in driving relationship to one of said conveyor chains, whereby said paddles sequentially wipe said oil-collecting end and said oil-dispensing end of said skimming boom, for dispensing the oil by gravity into said oil-collection tank as the oil flows from the surface of the water body over said skimming plate, responsive to adjustment of said skimming boom to immerse said oil-collecting end substantially at the oil-water interface in the water body.

9. The oil skimming apparatus of claim 8 further comprising winch means carried by said skimming boom and a winch cable engaging said skimming boom and said watercraft, for adjusting said skimming boom with respect to said watercraft.

10. The oil skimming apparatus of claim 9 further comprising:

(a) pump means mounted on said watercraft and provided in fluidcollection tank; and (b) weir means provided in said watercraft, said weir means communicating with said oil collection tank for substantially separating an oil-water mixture in said oil collection tank and wherein said drive means further comprises a gasoline engine.

11. The oil skimming apparatus of claim 10 further comprising a pair of stabilizing legs rotatably and slidably carried by said pontoons, respectfully, whereby said stabilizing legs are selectively rotatable from a first stored position substantially parallel to said pontoons to a second functional position substantially perpendicular to said pontoons and said stabilizing legs are slidably displaced in the water body with respect to said pontoons, for contacting the water bottom and stabilizing said watercraft in a selected position on the water body.

* * * * *